US011618280B2

(12) United States Patent
Bertoia et al.

(10) Patent No.: US 11,618,280 B2
(45) Date of Patent: Apr. 4, 2023

(54) LIGHTWEIGHT RADIALLY OUTER RING FOR A HUB-WHEEL ASSEMBLY

(71) Applicant: Aktiebolaget SKF, Gothenburg (SE)

(72) Inventors: Maurizio Bertoia, Turin (IT); Daniele Brogna, Venaria Reale (IT); Domenico Bruno, Turin (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/340,192

(22) Filed: Jun. 7, 2021

(65) Prior Publication Data
US 2021/0387474 A1 Dec. 16, 2021

(30) Foreign Application Priority Data

Jun. 10, 2020 (IT) .................. 102020000013732

(51) Int. Cl.
*F16C 33/58* (2006.01)
*B60B 27/00* (2006.01)

(52) U.S. Cl.
CPC ...... *B60B 27/0094* (2013.01); *B60B 27/0052* (2013.01); *F16C 33/581* (2013.01); *F16C 33/586* (2013.01); *B60B 27/001* (2013.01); *B60B 27/0005* (2013.01); *F16C 2326/02* (2013.01)

(58) Field of Classification Search
CPC .. F16C 33/581; F16C 33/586; F16C 2326/02; B60B 27/0005; B60B 27/001; B60B 27/0052; B60B 27/0094
See application file for complete search history.

(56) References Cited

U.S. PATENT DOCUMENTS

| | | | |
|---|---|---|---|
| 4,668,111 A | 5/1987 | Hendikus | |
| 4,948,277 A | 8/1990 | Denis | |
| 2011/0135233 A1 | 6/2011 | Sutherlin et al. | |
| 2018/0154691 A1* | 6/2018 | Andler | B60B 27/0005 |

FOREIGN PATENT DOCUMENTS

| | | |
|---|---|---|
| CN | 205615267 | 10/2016 |
| DE | 102015222474 | 10/1991 |
| DE | 102008009283 | 8/2009 |
| EP | 0454547 | 10/1991 |

OTHER PUBLICATIONS

Search Report for corresponding Italian Patent Application No. 2020000013732 dated Nov. 25, 2020.

* cited by examiner

Primary Examiner — Alan B Waits
(74) Attorney, Agent, or Firm — Reed Smith LLP

(57) ABSTRACT

Radially outer ring of a bearing unit for a hub-wheel assembly for motor vehicles, the radially outer ring being provided with: a flange portion having a plurality of axial fixing holes that connect an element of the motor vehicle wheel to the radially outer ring, an almost cylindrical portion which with part of its radially internal surfaces defines raceways for rows of rolling bodies of the bearing unit, an axially internal or axially external surface of the flange portion and a radially external surface of the cylindrical portion connected to each other by a first portion of toroidal surface (St1) and of a second portion of toroidal surface (St2) defined by corresponding first radius (R1) and second radius (R2), a truncated cone surface (Stc) defined by an angle (a) formed with a rotation axis (X) of the radially outer ring is interposed between the first portion of toroidal surface (St1) and the second portion of toroidal surface (St2).

17 Claims, 3 Drawing Sheets

Fig. 1 - Prior art

LIGHTWEIGHT RADIALLY OUTER RING FOR A HUB-WHEEL ASSEMBLY

CROSS-REFERENCE OF RELATED APPLICATION

This application is based on and claims priority to Italian Patent Application No. 102020000013732 filed on Jun. 10, 2020, under 35 U.S.C. § 119, the disclosure of which is incorporated by reference herein.

FIELD

The present disclosure relates to a lightweight radially outer ring of a bearing unit for a hub-wheel assembly.

BACKGROUND

A hub-wheel assembly provided with a bearing unit for rotatably supporting a wheel of a motor vehicle on a suspension is known and commonly used. A bearing unit, in general, includes a pair of rolling bodies but different configurations of bearing unit are also known, to which the present embodiments may be applied.

In the prior art, a hub-wheel assembly comprises a bearing unit provided with a rotary radially outer ring having a flange attachment for coupling to a rotary element of the motor vehicle, for example the wheel or the disc of a brake element. The bearing unit further comprises a pair of inner rings and a plurality of rolling bodies, e.g., balls, rollers or conical rollers. All of these components are axially symmetrical about the axis of rotation of the rotary elements, for example the radially outer ring of the bearing unit.

BRIEF DESCRIPTION OF THE DRAWINGS

Certain non-limiting exemplary embodiments will now be described with reference to the attached drawings, in which.

DETAILED DESCRIPTION

Figure 1:
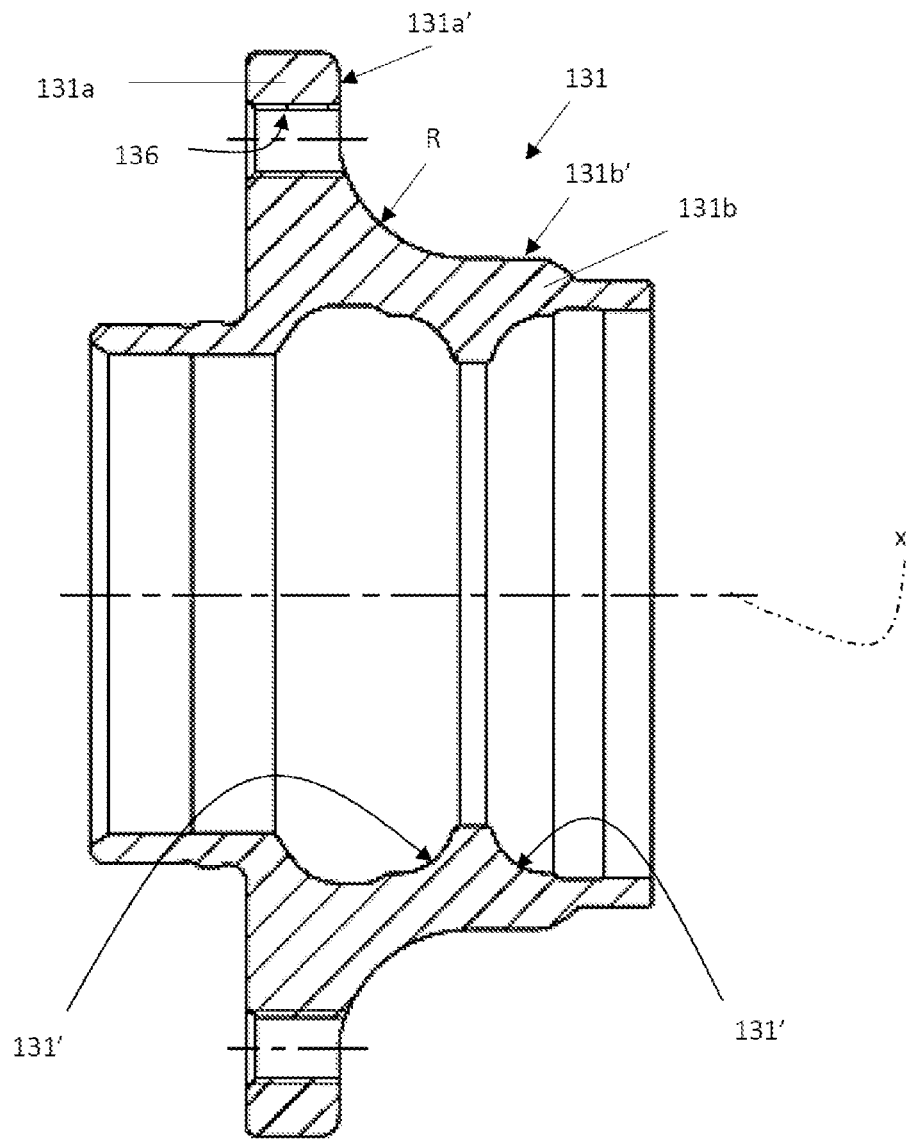
FIG. 1 is a cross section through a radially outer ring of a bearing unit, according to the prior art.

A wheel hub assembly is provided with a bearing unit, wherein the radially outer ring of the bearing unit, produced by forging, rotatably supports a wheel. Embodiments of a motor vehicle on a suspension. Embodiments of the disclosure also relate to a forged fixed radially outer ring of a bearing unit for a hub-wheel assembly, in which the wheel of the motor vehicle is supported by a rotary wheel hub In particular and with reference to FIG. 1, a radially outer ring 131 according to the prior art is produced by forging and is provided with a flange portion 131a, having a plurality of holes 136 for fixing the wheel or the disc of a brake element, and an almost cylindrical portion 131b which with part of its radially internal surfaces defines raceways 131' for the rolling bodies of the bearing unit. Respective surfaces of the two portions of the radially outer ring, specifically an axially internal surface 131a' of the flange portion 131a and a radially external surface 131b' of the cylindrical portion 131b, are connected to each other by means of a curved surface of radius R.

As a result of increasingly fierce international competition, there is constant demand from customers, e.g., motor vehicle manufacturers, for ongoing technical/financial improvements when it comes to hub-wheel assemblies. In particular, there is constant demand for an increase in performance or a reduction in the weight of the entire assembly—all without a corresponding increase in cost, naturally. It is therefore necessary to completely rethink the design of the hub-wheel assembly or some of its components in order to at least maintain the same level of performance while reducing weight, or enhance the performance of the assembly without increasing the weight. In the case of hub-wheel assemblies with a flanged radially outer ring, this is the heaviest and most bulky component. However, the technological constraints of forging do not allow a great deal of freedom for designers seeking to limit the size and weight of these components. Excess material may be eliminated by machining after forging, for example machining to remove shavings. However, this makes the production process more complicated and expensive.

It is therefore necessary come up with a suitable solution for a radially outer ring of a bearing unit for a hub-wheel assembly which does not have the abovementioned disadvantages.

With a view to substantially solving the technical problems described above and to satisfy the demand described above, one aim of the embodiments in accordance with this disclosure is to produce a new shape of radially outer ring obtained by forging, in which this new shape is designed to reduce the weight of the radially outer ring and enhance, or at least maintain, the performance required of the bearing unit.

This aim is achieved by producing the radially outer ring such that an axially internal surface of the flange portion and a radially internal surface of the cylindrical portion are connected to each other by means of a first and a second portion of toroidal surface defined by predetermined connection radii, wherein between the two toroidal surfaces there is interposed a truncated cone surface defined by a predetermined angle formed with the rotation axis of the radially outer ring.

With the aim of achieving the best compromise between technological constraints, related to the forging process, and structural constraints, preferably, the radius of the first portion of toroidal surface will be between 1.5 mm and 7 mm, while the radius of the second portion of toroidal surface should be greater than twice the radius of the first portion of toroidal surface.

Moreover, to optimize the trade-off between reduction in weight and mechanical strength, advantageously, the angle with respect to the axis of rotation of the radially outer ring should be between 10° and 20°.

Preferably, to facilitate machining, the centers of the two portions of toroidal surfaces will be positioned relative to other elements of the radially outer ring, as will be explained in more detail below.

This new shape of the forged radially outer ring makes it possible to avoid adding unnecessary material and, therefore, depending on the application, to reduce or limit the final weight of said radially outer ring. It also makes it possible to obtain a substantially constant thickness of material above the two raceways of the bearing unit and the axially external groove used for insertion of the axially external row of balls.

Therefore, embodiments of the disclosure provide a radially outer ring of a bearing unit for a hub-wheel assembly having the features set out in the claims attached to this description.

Certain exemplary embodiments may be applied to all generations of hub-wheel assemblies. In particular, such applications include cases in which the outer ring of the bearings is rotary while the inner rings of the bearing are fixed, and the opposite case in which the inner rings rotate and the outer ring is fixed. Exemplary embodiments are also suitable for any type of rolling body (balls, rollers, conical rollers, etc.).

Certain exemplary embodiments also relate to a bearing unit provided with a radially outer ring according to one of the embodiments of the present disclosure.

By way of non-limiting example, exemplary embodiments will now be described with reference to a hub-wheel assembly for motor vehicles provided with a bearing unit.

Figure 2:
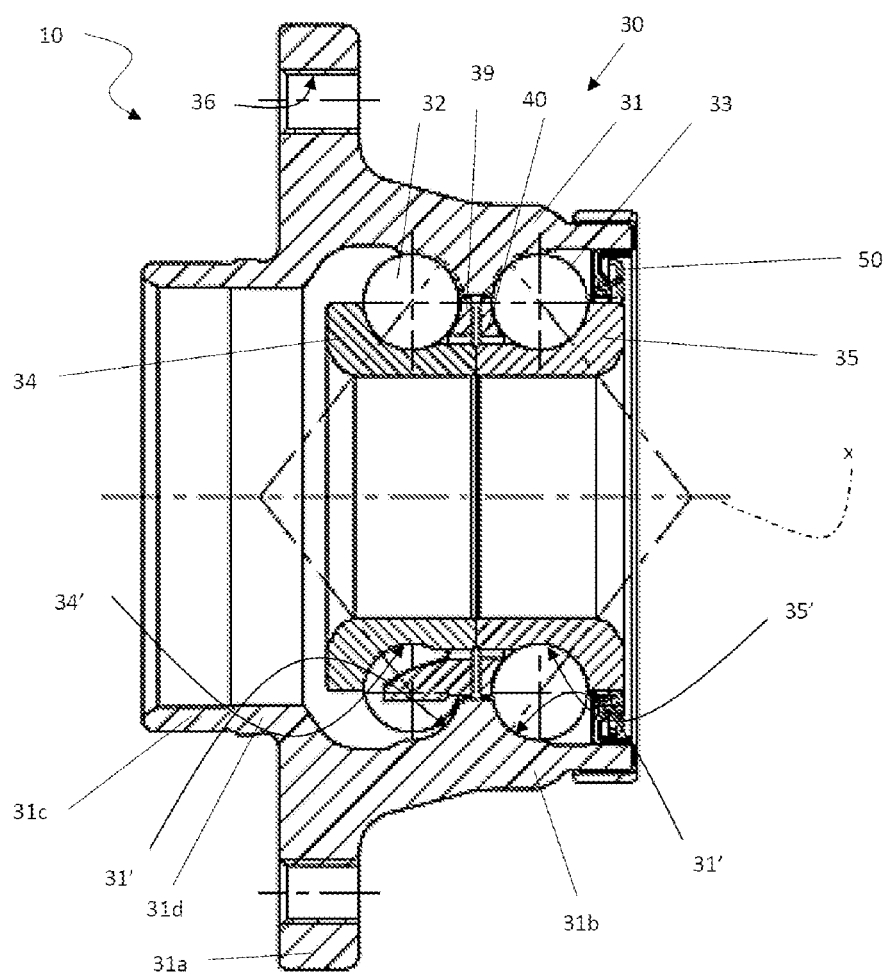
FIG. 2 is a cross section through a hub-wheel assembly provided with a radially outer ring, according to exemplary embodiments.

With reference to FIG. 2, a hub-wheel assembly according to a preferred embodiment of the invention is designated as a whole by the reference sign 10. FIG. 2 shows a detail of an exemplary configuration.

The hub-wheel assembly 10 has a central axis of rotation X and includes a bearing unit 30, which in turn comprises a radially outer ring 31, that is preferably, but not necessarily, a rotary ring. Such a bearing unit also includes a pair of radially inner rings 34, 35, that are preferably, but not necessarily, fixed rings; two rows of rolling bodies 32, 33, in the example show rolling bodies 32, 33 are illustrated as balls (but could be other shaped rolling bodies), interposed between the radially outer ring 31 and the radially inner rings 34, 35; and two containment cages 39, 40 to hold the rolling bodies of the rows 32, 33 in position.

Throughout the present description and in the claims, the terms and expressions indicating positions and orientations, such as "radial" and "axial", refer to the central axis of rotation X of the bearing unit 30. Expressions such as "axially external" and "axially internal", on the other hand, refer to the hub-wheel assembly when mounted, and in the case at hand, preferably, refer to a wheel side and a side opposite the wheel, respectively.

The radially outer ring 31 is provided with two respective radially outer raceways 31', while the radially inner rings 34, 35 are provided with respective radially internal raceways 34', 35' to allow rolling of the axially external row of rolling bodies 32 interposed between the radially outer ring 31 and the radially inner ring 34, and the axially internal row of rolling bodies 33 between the radially outer ring 31 and the radially inner ring 35. For the sake of simplicity in the drawings, the reference signs 32, 33 will designate both individual balls and rows of balls. Again for the sake of simplicity, the term "ball" may be used by way of example in the present description and in the attached drawings instead of the more generic term "rolling body" (the same reference signs also being used).

The hub-wheel assembly 10 may furthermore be provided with sealing means 50 for sealing the bearing unit with respect to the external environment. Sealing means 50 may be seals, e.g., seal 50.

The radially outer ring 31 has an axially external flange portion 31a. The flange portion has a plurality of axial fixing holes 36. These holes serve as seats for as many fixing means (for example stud bolts, not shown in the FIGS.) which, in a known manner, connect an element of the wheel of the motor vehicle, for example the wheel or the disc of the brake (also of known type and not shown in the FIGS.), to the radially outer ring 31. Moreover, the radially outer ring 31 is provided with an almost cylindrical portion 31b which with part of its radially internal surfaces defines the raceways 31' for the rolling bodies of the bearing unit 30.

In some embodiments, the radially outer ring 31 may have a first cylindrical portion 31c, axially external, which acts as a centering means for the element of the wheel of the motor vehicle, and a second cylindrical portion 31d, also axially external but less protruded than the first cylindrical portion 31c, acting as a centering means for the brake disc of the motor vehicle.

Figure 3:
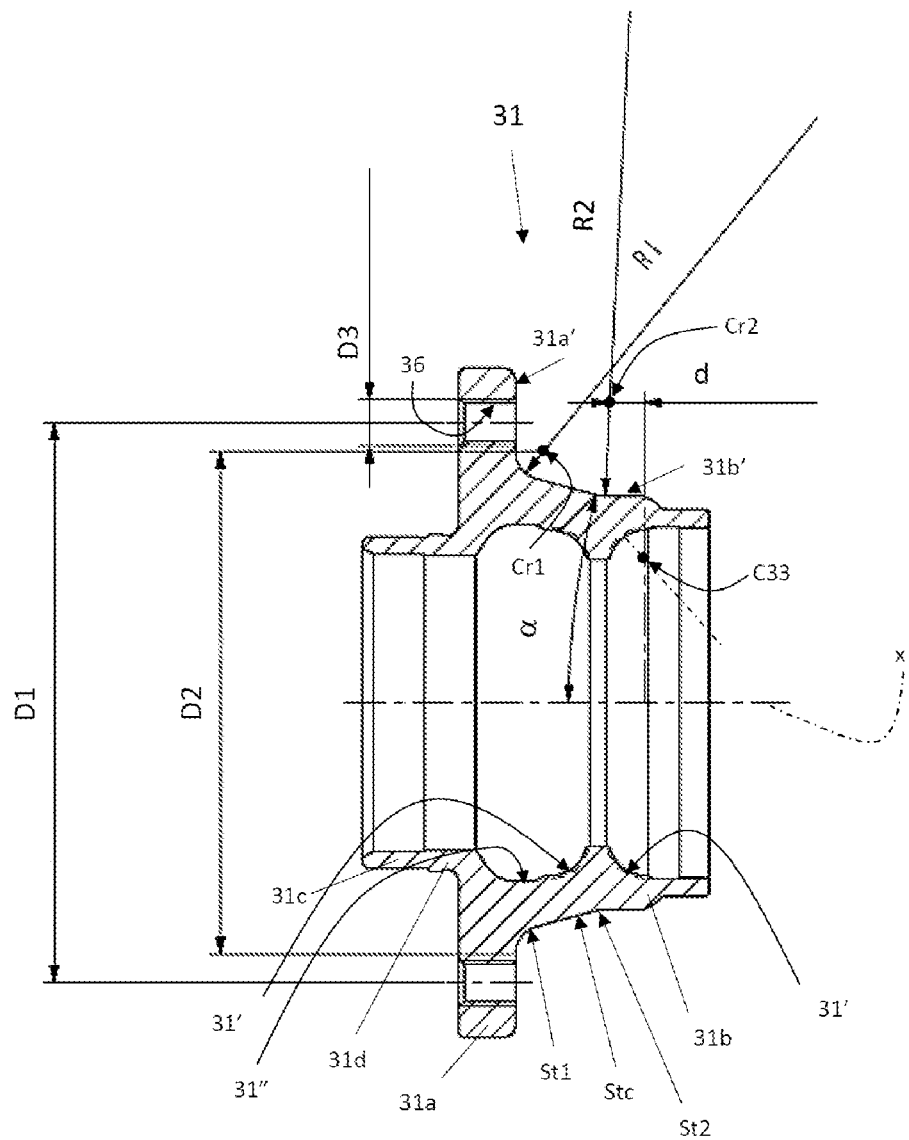
FIG. 3 shows the radially outer ring of the hub-wheel assembly of FIG. 2.

As can be seen more clearly with reference to FIG. 3, the radially outer ring 31, according to one aspect of the exemplary embodiments, has a shape such that an axially internal surface 31a' of the flange portion 31a and a radially internal surface 31b' of the cylindrical portion 31b are connected to each other by means of a first portion of toroidal surface St1 and of a second portion of toroidal surface St2 defined by corresponding first radius R1 and second radius R2. For the sake of simplicity, below, the two portions of toroidal surface will be defined as toroidal surfaces, it being understood in all cases that they are partially toroidal surfaces.

Between the first toroidal surface St1 and the second toroidal surface St2 there is interposed a truncated cone surface Stc defined by an angle α formed with a rotation axis X of the radially outer ring 31.

Preferably, the first radius R1 of the first toroidal surface St1 may take on values between 1.5 mm and 7 mm. The aim is to achieve the best compromise between technological constraints, related to the forging process, and structural constraints. To be specific, values below 1.5 mm would not be attainable in an ordinary forging process, while values above 7 mm, although advantageous from the viewpoint of reducing the weight of the radially outer ring 31 as a whole, would impair the mechanical strength of the component, rendering it unsuitable for more demanding applications in which it must withstand considerable loads. In some applications already tested, a value of the first radius R1 of 5 mm represented a first optimum compromise between the divergent requirements mentioned above.

Again, for the same reasons of achieving a technological/structural trade-off, the second radius R2 of the second toroidal surface St2 should preferably be greater than the first radius R1 of the first toroidal surface St1 and, even more preferably, greater than twice said first radius R1.

Moreover, to optimize the trade-off between reduction in weight and mechanical strength, advantageously, the angle α of the truncated cone surface Stc with respect to the axis of rotation X of the radially outer ring 31 should be between 10° and 20°.

Preferably, to facilitate machining, the centers of the two toroidal surfaces St1, St2 will be positioned relative to other elements of the radially outer ring 31.

In particular, the first toroidal surface St1 connects to the axially internal surface 31a' of the flange portion 31a—which is an annular surface—so that the center Cr1 of the first toroidal surface St1 is positioned at a predetermined diameter D2. This diameter D2 is calculated as the difference between the diameter D1 of the axes of the axial fixing holes 36 and the diameter D3 of the same axial fixing holes 36. This difference may be increased or reduced in a range between +3 mm and −3 mm, depending on the application. In mathematical terms, it should therefore be:

$$D2 = D1 - D3 \pm 3 \text{ mm}$$

Furthermore, the second toroidal surface St2 is connected to the truncated cone surface Stc and, on the opposite side, to the radially external surface 31*b*' of the cylindrical portion 31*b*. Its center Cr2 may refer to the axial position of the centers C33 of the rolling bodies of the axially internal row 33 in a range between −7 mm and +7 mm, it being understood that this center Cr2 may be located in an axial environment with respect to the center C33 with a half-width of 7 mm.

The same design considerations may be applied also in the case of a fixed radially outer ring. In this case, as is known practice, the shape of the ring will be almost a mirror image of the shape described above, with the flange portion, connected to a fixed structure of the motor vehicle (for example the upright of a suspension), on the axially internal side. The only difference with respect to the case analysed above will be the axial reference of the center Cr2 of the second toroidal surface: this center will in fact refer to the axial position of the centers of the rolling bodies of the axially external row 32 (rather than the centers of the rolling bodies of the axially internal row 33).

To sum up, this new shape of the forged radially outer ring makes it possible to avoid adding unnecessary material and, therefore, depending on the application, to reduce the weight of the radially outer ring for similar applications or to limit the final weight of said radially outer ring for more demanding applications.

This optimization of material also makes it possible to obtain an almost constant thickness of material above the two raceways 31' of the radially outer ring 31 and the axially external groove 31" used for insertion of the axially external row of rolling bodies 32.

Lastly, this new design aimed at optimizing the trade-off between weight and performance also makes it possible to preserve the feasibility of the forging process and not have to proceed with further machining operations to remove shavings, thereby keeping down the cost of the entire method for production of the radially outer ring.

In addition to the exemplary embodiments described above, note that there numerous other variants. It must thus be understood that these embodiments are merely examples and do not limit either the scope of the invention or its applications, or its possible configurations. On the contrary, although the above description allows a person skilled in the art to implement the present invention at least according to one exemplary embodiment thereof, it must be understood that many variants of the components described are possible, without departing from the scope of the invention as defined in the attached claims, interpreted literally and/or in accordance with their legal equivalents.

The invention claimed is:

1. A radially outer ring of a bearing unit for a hub-wheel assembly for motor vehicles, comprising:
a flange portion comprising a plurality of axial fixing holes configured to connect to an element of the motor vehicle wheel to the radially outer ring;
a substantially cylindrical portion which with part of its radially internal surfaces defines raceways configured for rows of rolling bodies of the bearing unit;
wherein an axially internal or axially external surface of the flange portion and a radially external surface of the cylindrical portion are connected to each other by a first portion of toroidal surface (St1) and of a second portion of toroidal surface (St2) defined by corresponding first radius (R1) and second radius (R2), the second radius (R2) of the second portion of toroidal surface (St2) is greater than twice the first radius (R1) of the first portion of toroidal surface (St1), and
wherein between the first portion of toroidal surface (St1) and the second portion of toroidal surface (St2) there is interposed a truncated cone surface (Stc) defined by an angle ($\alpha$) formed with a rotation axis (X) of the radially outer ring.

2. The radially outer ring according to claim 1, wherein the first radius (R1) of the first portion of toroidal surface (St1) comprises values between 1.5 mm and 7 mm.

3. The radially outer ring according to claim 1, wherein the angle (a) of the truncated cone surface (Stc) with respect to the axis of rotation (X) of the radially outer ring is between 10° and 20°.

4. The radially outer ring according to claim 1, wherein the first portion of toroidal surface (St1) connects to the axially internal or axially external surface of the flange portion so that a center (Cr1) of the first portion of toroidal surface (St1) is positioned at a predetermined diameter (D2), calculated as the difference between a diameter (D1) of a circle along which the axes of the axial fixing holes are arranged and a diameter (D3) of an individual one of the same axial fixing holes.

5. The radially outer ring according to claim 4, wherein the value of the predetermined diameter (D2) is increased or reduced in a range between +3 mm and −3 mm.

6. The radially outer ring according to claim 1, wherein the second portion of toroidal surface (St2) is connected to the truncated cone surface (Stc) and to the radially external surface of the cylindrical portion, and a center (Cr2) of the second portion of toroidal surface (St2) is axially positioned with respect to the centers of the rolling bodies of one of the rows of rolling bodies.

7. The radially outer ring according to claim 6, wherein the center (Cr2) is positioned in an axial range with respect to the center (C33) of the rolling bodies of the row of rolling bodies axially internal or in an axial range with respect to the center (C32) of the rolling bodies of the row of rolling bodies axially external, the axial range comprising 14 mm.

8. The radially outer ring according to claim 1, further comprising a first cylindrical portion axially external, which is configured to act as a centering means for an element of a wheel of the motor vehicle, and a second cylindrical portion, also axially external but less protruded than the first cylindrical portion, the second cylindrical portion configured to act as a centering means for a brake disc of the motor vehicle.

9. A hub-wheel assembly for motor vehicles, comprising:
a radially outer ring;
a pair of radially inner rings;
two rows of rolling bodies, interposed between the radially outer ring and the radially inner rings; and
two containment cages to hold the rolling bodies of the rows of rolling bodies in position,
wherein the radially outer ring comprises:
a flange portion comprises a plurality of axial fixing holes that are configured to connect an element of the motor vehicle wheel to the radially outer ring;
a substantially cylindrical portion which with part of its radially internal surfaces defines raceways for the two rows of rolling bodies of a bearing unit;
wherein an axially internal or axially external surface of the flange portion and a radially external surface of the cylindrical portion are connected to each other by a first portion of toroidal surface (St1) and of a second portion of toroidal surface (St2) are defined by corresponding first radius (R1) and second radius (R2), wherein the second radius (R2) of the second portion of toroidal surface (St2) is greater than twice the first radius (R1) of the first portion of toroidal surface (St1), and wherein between the first portion of toroidal surface (St1) and the second portion of toroidal surface (St2) there is interposed a truncated cone surface (Stc) defined by an angle (α) formed with a rotation axis (X) of the radially outer ring.

10. The hub-wheel assembly according to claim 9, wherein the first radius (R1) of the first portion of toroidal surface (St1) comprises values between 1.5 mm and 7 mm.

11. The hub-wheel assembly according to claim 9, wherein the angle (a) of the truncated cone surface (Stc) with respect to the axis of rotation (X) of the radially outer ring is between 10° and 20°.

12. The hub-wheel assembly according to claim 9, wherein the first portion of toroidal surface (St1) connects to the axially internal or axially external surface of the flange portion so that a center (Cr1) of the first portion of toroidal surface (St1) is positioned at a predetermined diameter (D2), calculated as the difference between a diameter (D1) of a circle along which the axes of the axial fixing holes are arranged and a diameter (D3) of an individual one of the same axial fixing holes.

13. The hub-wheel assembly according to claim 12, wherein the value of the predetermined diameter (D2) is increased or reduced in a range between +3 mm and −3 mm.

14. The hub-wheel assembly according to claim 9, wherein the second portion of toroidal surface (St2) is connected to the truncated cone surface (Stc) and to the radially external surface of the cylindrical portion, and a center (Cr2) of the second portion of toroidal surface (St2) is axially positioned with respect to the centers of the rolling bodies of one of the rows of rolling bodies.

15. The hub-wheel assembly according to claim 14, wherein the center (Cr2) is positioned in an axial range with respect to the center (C33) of the rolling bodies of the row of rolling bodies axially internal or in an axial range with respect to the center (C32) of the rolling bodies of the row of rolling bodies axially external, the axial range comprising 14 mm.

16. The hub-wheel assembly according to claim 9, further comprising a first cylindrical portion axially external, which is configured to act as a centering means for an element of a wheel of the motor vehicle, and a second cylindrical portion, also axially external but less protruded than the first cylindrical portion, the second cylindrical portion configured to act as a centering means for a brake disc of the motor vehicle.

17. A radially outer ring of a bearing unit for a hub-wheel assembly for motor vehicles, comprising:

a flange portion comprising a plurality of axial fixing holes and defining an external surface;

a radially external surface of a cylindrical portion connected to the external surface by a first portion of a first toroidal surface (St1) and of a second portion of a second toroidal surface (St2) defined in part by corresponding first radius (R1) and second radius (R2) respectively, and a truncated cone surface (Stc) defined by an angle (α) formed with a rotation axis (X) of the radially outer ring, the truncated cone surface interposed between the first portion of toroidal surface (St1) and the second portion of toroidal surface (St2), wherein the first radius (R1) of the first portion of toroidal surface (St1) comprises values between 1.5 mm and 7 mm, further wherein the second radius (R2) of the second portion of toroidal surface (St2) is greater than twice the first radius (R1) of the first portion of toroidal surface (St1), further wherein the angle (α) of the truncated cone surface (Stc) with respect to the axis of rotation (X) of the radially outer ring is between 10° and 20°, further wherein a center (Cr1) of the first portion of toroidal surface (St1) is positioned at a predetermined diameter (D2), equal to a value between +3 mm and −3 mm, is the defined as a difference between a diameter (D1) of axes of radially opposing axial fixing holes and a diameter (D3) of the same axial fixing holes.

* * * * *